(12) United States Patent
DiBiasio

(10) Patent No.: US 11,110,642 B1
(45) Date of Patent: Sep. 7, 2021

(54) MULTI-PRONG BLOW PIN WITH INTEGRAL AIR AND COOLING WATER CHANNELS

(71) Applicant: Silgan Plastics LLC, Chesterfield, MO (US)

(72) Inventor: Sergio DiBiasio, Etobicoke (CA)

(73) Assignee: Silgan Plastics LLC, Chesterfield, MO (US)

( * ) Notice: Subject to any disclaimer, the term of this patent is extended or adjusted under 35 U.S.C. 154(b) by 0 days.

(21) Appl. No.: 16/828,488

(22) Filed: Mar. 24, 2020

(51) Int. Cl.
*B29C 49/58* (2006.01)
*B29C 49/60* (2006.01)
*B29C 49/66* (2006.01)
*B29L 31/00* (2006.01)

(52) U.S. Cl.
CPC ............. *B29C 49/60* (2013.01); *B29C 49/58* (2013.01); *B29C 49/66* (2013.01); *B29C 2049/5803* (2013.01); *B29C 2049/5889* (2013.01); *B29C 2049/6009* (2013.01); *B29L 2031/712* (2013.01)

(58) Field of Classification Search
CPC ............ B29C 49/58; B29C 2049/5803; B29C 2049/5889
See application file for complete search history.

(56) References Cited

U.S. PATENT DOCUMENTS

| | | | | |
|---|---|---|---|---|
| 3,538,543 A | * | 11/1970 | Nataf | B29C 49/4802 425/535 |
| 4,070,140 A | * | 1/1978 | Lucas | B29C 45/36 425/468 |
| 4,759,708 A | * | 7/1988 | Hestehave | B29C 49/30 425/526 |
| 5,135,702 A | * | 8/1992 | Eales | H01M 50/258 264/516 |
| 5,882,574 A | * | 3/1999 | Geisinger | B29C 49/022 215/6 |
| 6,335,204 B1 | * | 1/2002 | Kuo | B01L 3/021 422/513 |
| 9,751,248 B2 | | 9/2017 | DiBiasio | |
| 2002/0074347 A1 | * | 6/2002 | Murray | B65D 81/3283 222/129 |

* cited by examiner

*Primary Examiner* — Robert B Davis
(74) *Attorney, Agent, or Firm* — Reinhart Boerner Van Deuren s.c.

(57) ABSTRACT

A dual or multi-prong blow pin having air channels and a water cooling manifold integrally formed in the blow mold pin. The pin is formed by 3D depositing a metal such as stainless steel, which permits the formation of a blow mold pin having an intricate shape with internal air and water channels. The use of 3D deposition allows the manufacture such a blow mold pin, which may be difficult or impossible to form using conventional casting and machining methods.

19 Claims, 17 Drawing Sheets

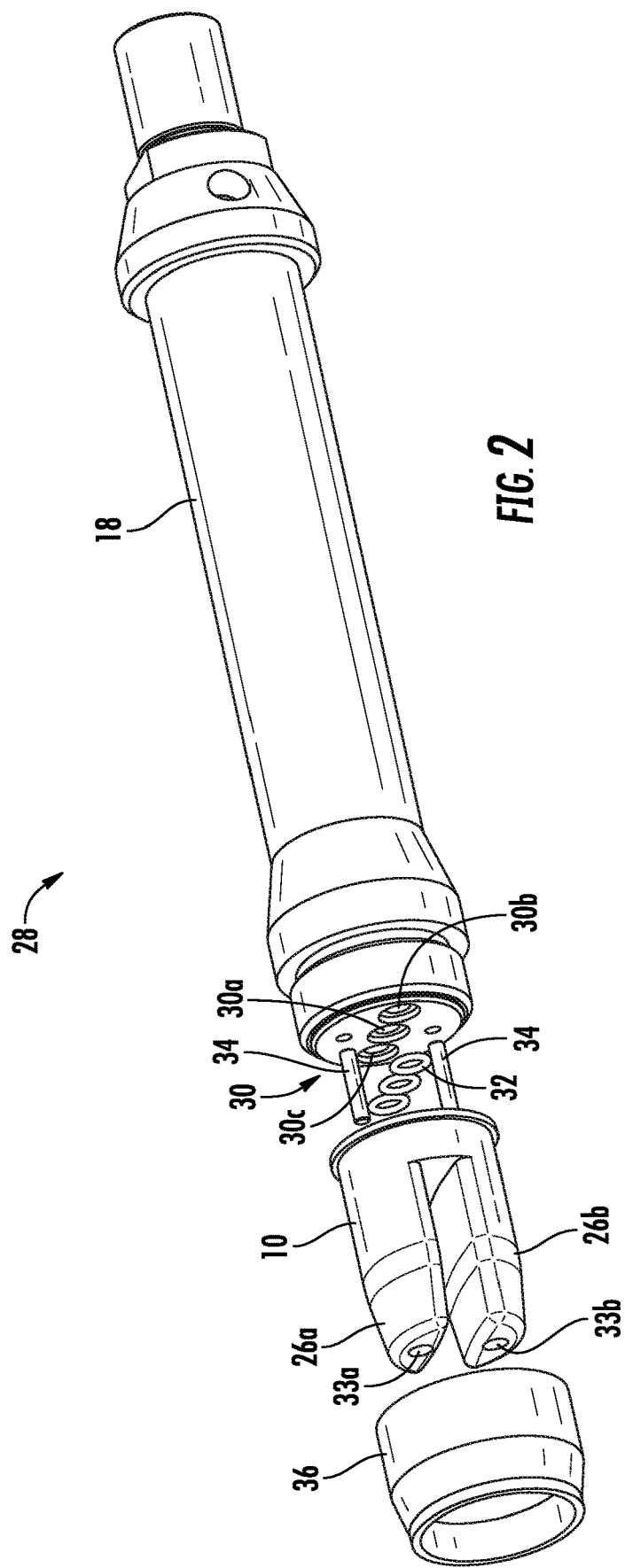

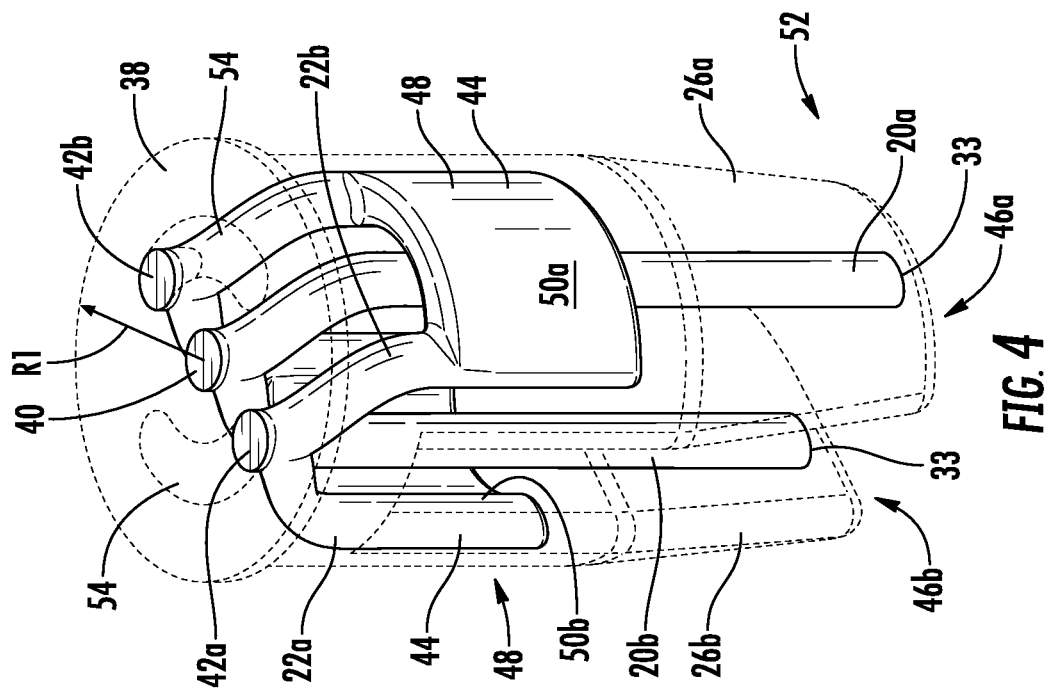
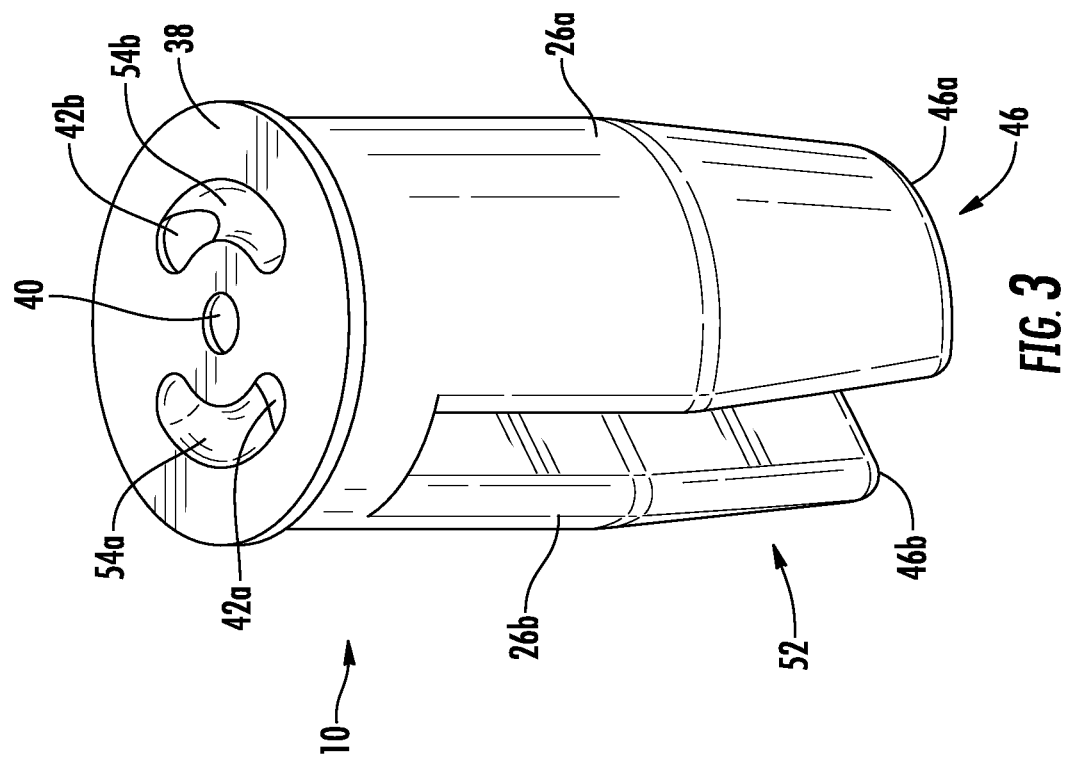

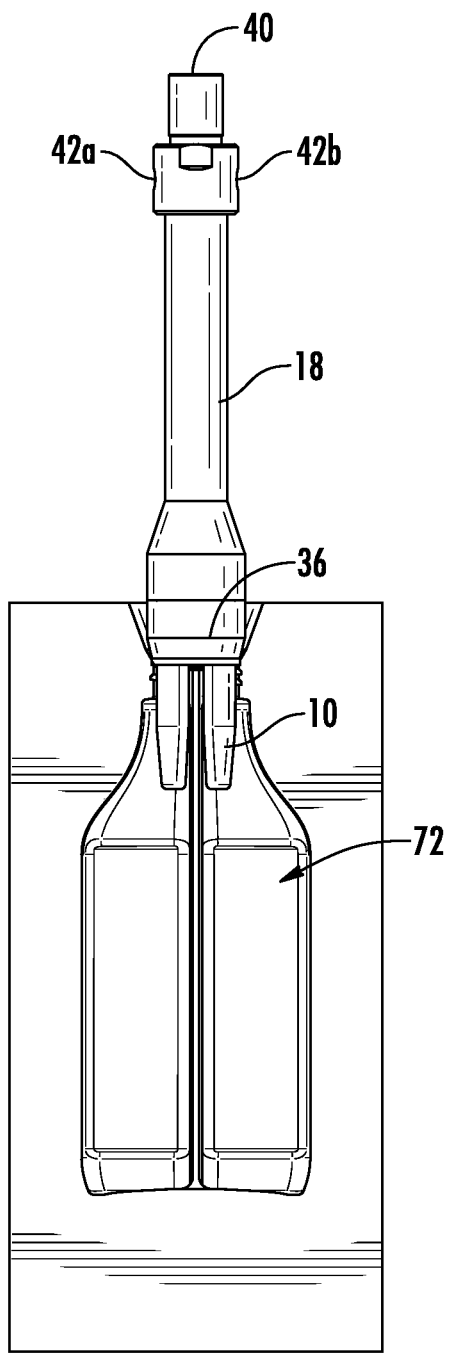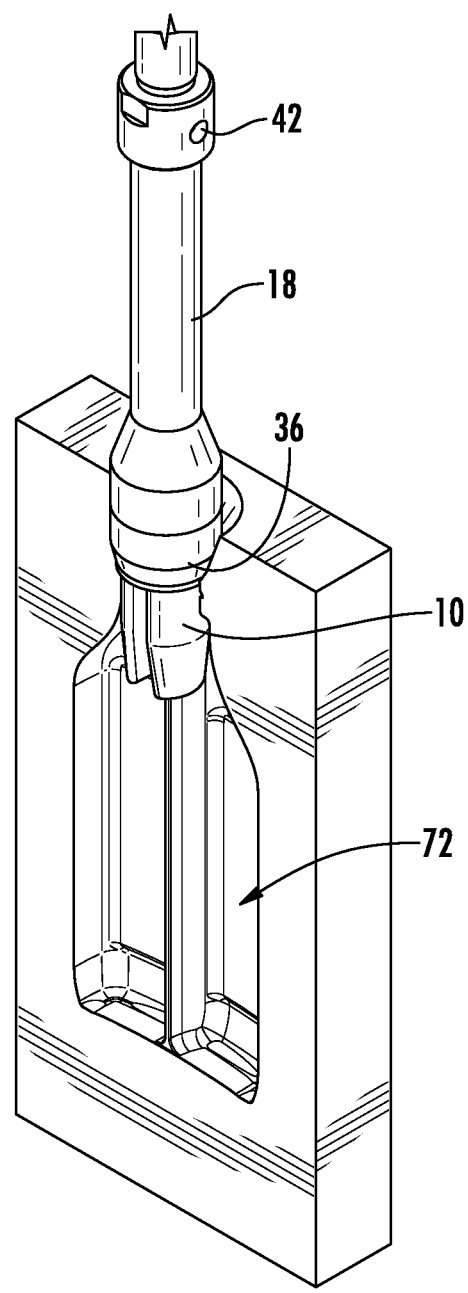
FIG. 32A
FIG. 32B

MULTI-PRONG BLOW PIN WITH INTEGRAL AIR AND COOLING WATER CHANNELS

BACKGROUND OF THE INVENTION

The present generally relates to blow molding dual or multi-chamber plastic bottles. More specifically, the present invention relates to a dual or multi-prong blow pin having air channels and a water cooling manifold integrally formed in the blow mold pin. The pin is formed by 3D depositing a metal such as stainless steel.

SUMMARY OF THE INVENTION

One embodiment of the invention provides for a blow mold pin for use in forming a blow-molded container, including at least first and second chambers. The pin includes a prong base having an air inlet, a water inlet, and a water outlet. The pin is formed with first and second parallel prongs extending from the prong base. The first and second prongs each include an air inlet, an air duct coupled to the air inlet to form an air passage from the air inlet to the respective end of the prong. The prongs also include a cooling manifold coupled between a water inlet and a water outlet. Air flows through the prongs to inflate a plastic material to form the container. Water flows through the manifolds to cool the respective prongs during the molding process.

Another embodiment of the invention provides for a blow molding assembly, which includes a blow mold pin for use in forming a blow-molded container, including at least first and second chambers. The pin has a prong base with an air inlet, a water inlet, and a water outlet. The pin is formed with first and second parallel prongs extending from the base. The first and second prongs each include an air inlet, an air duct coupled to the air inlet to form an air passage from the air inlet to the respective end of the prong. The prongs also include a cooling manifold coupled between a water inlet and a water outlet. The assembly also includes a cylindrical blow pin body extending from a first body end to a blow pin interface. The body has an air channel, and two water channels extending from the body end to the blow pin interface to supply air to the blow pin and cooling water to and from the blow pin. A collar engages an engagement ring on the blow pin and the blow pin body proximate to the interface to fasten the blow pin to the blow pin body. Air flows through the body and blow pin to inflate a plastic material to form the container. Water flows through the manifolds from the blow pin body to cool the respective prongs during the molding process.

Another embodiment of the invention provides for a blow molding assembly, which includes a blow mold pin for use in forming a blow-molded container, including at least first and second chambers. The pin has a prong base having an air inlet, a water inlet, and a water outlet. The pin is formed with first and second parallel prongs extending from the prong base. The first and second prongs each include an air inlet, an air duct coupled to the air inlet to form an air passage from the air inlet to the respective end of the prong. The prongs also include a cooling manifold coupled between a water inlet and a water outlet. The assembly also includes a cylindrical blow pin body extending from a first body end to a blow pin interface. The body has an air channel, and two water channels extending from the body end to the blow pin interface to supply air to the blow pin and cooling water to and from the blow pin. A collar engages an engagement ring on the blow pin and the blow pin body proximate to the interface to fasten the blow pin to the blow pin body. The assembly also includes a mold cavity defining at least two chambers for a multi-chamber plastic container wherein the chambers are in communication with a single-threaded circular opening. A blow pin body extender is coupled to the body to extend the blow pin relative to the mold cavity to form the plastic container when air flows through the blow pin to inflate the plastic material into contact with the interior surface of the mold.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 2 is an exploded view of a blow pin assembly for blow molding a dual-chamber container, showing the blow pin, blow pin body, air and water channels, and a collar, according to an exemplary embodiment.

FIG. 3 is a perspective view of a blow pin for blow molding a dual-chamber plastic container.

FIG. 4 is a perspective view of the blow pin illustrating the internal air and water channels in the pin.

FIG. 32A is a side view of a blow pin attached to a blow pin body with the blow pin positioned within a closed mold cavity.

FIG. 32B is a side sectional view a blow pin attached to a blow pin body with the blow pin positioned within the closed mold cavity.

DETAILED DESCRIPTION

Figure 1:
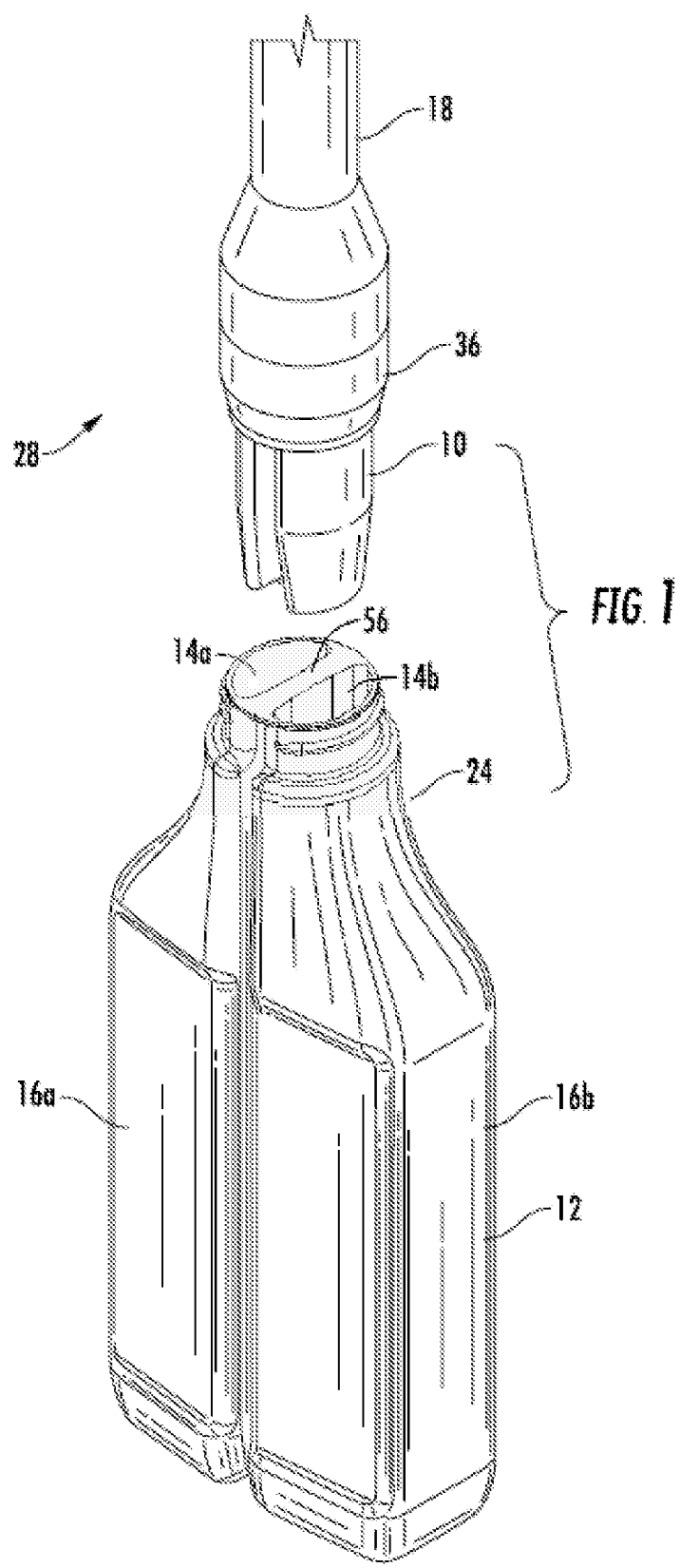
FIG. 1 is a perspective view of a blow pin assembly with a blow mold pin that forms a dual-chamber plastic container, according to an exemplary embodiment.

FIG. 1 shows a perspective view of a blow mold pin or blow pin 10 that forms a dual-chamber plastic container 12 (e.g., with two openings 14a and 14b that lead to two corresponding chambers 16a and 16b, respectively). Blow pin 10 couples to a blow pin body 18 with a gas channel 20 and cooling channels 22 (FIGS. 4-6 and 10-17). Gas channels 20 exit blow pin 10 to form openings 14 and chambers 16. Cooling channels 22 circulate throughout blow pin 10 to cool blow pin 10, e.g., during molding operations.

Container 12 has a single neck 24 for openings 14 and/or chambers 16. In some embodiments, blow pin 10 forms a calibrated finish for each gas channel 20 blown and molded into neck 24. As shown with reference to FIGS. 1-6, blow pin 10 bifurcates or branches an air or gas channel 20 (FIG. 4) supplied by blow pin body 18 to blow air into the molded dual chambers 16 of container 12. For example, a first gas channel 20a flows through a first prong 26a, and a second gas channel 20b flows through a second prong 26b. Similarly, the bifurcated branch also divides a water or coolant channel 22 in blow pin body 18 into two bifurcated coolant channels 22. For example, a first coolant channel 22a flows through a first prong 26a, and a second coolant channel 22b flows through a second prong 26 of blow pin 10.

In other words, blow pin 10 is bifurcated or branch shaped to form dual-chamber plastic container 12 with a single neck 24 and multiple openings 14a and 14b. Neck 24 merges into two respective openings 14a and 14b for each chamber 16a and 16b. For example, coolant channel 22a flows through first prong 26a and coolant channel 22b flows through second prong 26b, respectively, to cool blow pin 10. In this embodiment, each prong 26 is supplied with both a blow gas channel 20 and a cooling channel 22. In this way, blow pin 10 can be used to form a calibrated finish on injection molds of dual-chamber container 12 with at least first chamber 16a and second chamber 16b.

FIG. 2 is an exploded view of a blow pin assembly 28. In this view, blow pin 10 is separated from blow pin body 18, and outlets 30 on blow pin body 18 are shown for a gas outlet 30a, a coolant outlet 30b, and/or a coolant inlet 30c. In various embodiments, the locations of coolant outlet 30b and/or coolant inlet 30c may be reversed without changing the function of the blow pin body 18. Seals 32 or O-rings are shown between the blow pin body 18 and the blow pin 10 to seal gas outlet 30a and coolant outlet 30b and coolant inlet 30c against blow pin 10. Similarly, blow pin 10 has gas outlets 33a and 33b on first and second prongs 26a and 26b, respectively, that eject gas from blow pin 10 into a mold, e.g., to form dual-chambered container 12. In the illustrated embodiment of FIG. 2, pins 34 are shown to keep blow pin assembly 28 aligned, e.g., to align gas channel 20 and coolant channels 22 in blow pin 10 with outlets 30 of blow pin body 18. For example, when collar 36 is attached over blow pin 10 and threadedly coupled to blow pin body 18, collar 36 secures blow pin 10 gas channel 20 against gas outlet 30a, and coolant channels 22 in blow pin 10 against coolant outlet 30b and coolant inlet 30c of blow pin body 18. Pins 34 prevent rotation of blow pin 10 relative to blow pin body 18 as collar 36 rotates about blow pin 10. FIG. 2 shows blow pin 10 and blow pin body 18 coupled by collar 36 and configured to blow mold dual-chamber container 12.

As shown in FIGS. 3 and 4, blow pin 10 has a top plate or prong base 38 with a gas inlet 40, a coolant inlet 42a, and a coolant outlet 42b. Coolant, such as water, passes through coolant inlet 42a and into manifolds 44, where it is temporarily stored to cool prongs 26 and/or gas channel 20. In various embodiments, a shape of blow pin 10 forms dual-chamber plastic container 12 with a single neck 24 and/or opening 14, which merges with each respective openings 14a and 14b communicating with each chamber 16a and 16b, respectively. For example, blow pin 10 includes layers of stainless steel metal powder that are laser sintered together to form a continuous single-piece or integral piece blow pin 10.

With reference to FIGS. 3 to 4, first prong 26a is associated with first chamber 16a, and second prong 26b is associated with second chamber 16b of dual-chamber container 12. First prong 26a extends from prong base 38 to first end 46a and is integrally formed with prong base 38 and/or second prong 26b. For example, first prong 26a, second prong 26b, and prong base 38 form an integrally formed single unitary part. Second prong 26b is substantially parallel (e.g., +/−5°) to first prong 26a and extends from prong base 38 to a second end 46. In some embodiments, blow pin 10 includes prong base 38 and prongs 26 formed from layers of stainless steel metal powder that is laser sintered to create an integral one-piece blow pin 10.

First prong 26a defines a first air or gas duct, passage, or gas channel 20 that couples to gas inlet 40 and forms a first gas channel 20a from gas inlet 40 to a gas outlet 30a on first end 46a. Second prong 26b defines a second gas channel 20*b*, the same as or similar to first gas channel 20*a*. Like first gas channel 20*a*, second gas channel 20*b* couples to gas inlet 40 to form a second gas channel 20*b* from gas inlet 40 to gas outlet 30*ab* on second end 46*b*. First prong 26*a* defines first coolant manifold 44*a* coupled between coolant inlet 42*a* and coolant outlet 42*b* to form coolant channel 22. Similarly, second prong 26*b* defines a second coolant manifold 44 coupled between coolant inlet 42*a* and coolant outlet 42*b*. Coolant channel 22 forms between coolant inlet 42*a* and outlet 42*b* in second prong 26*b*. In various embodiments, manifolds 44 include a semi-cylindrical chamber 48. Chamber 48 has a first or outer side 50*a* and a second or inner side 50*b*. A first tube or coolant channel 22*a* connects outer side 50*a* to coolant inlet 42*a*, and a second coolant channel 22*b* connects inner side 50*b* to coolant outlet 42*b*.

In some embodiments, prong base 38 is cylindrical. For example, prong base 38 is a cylinder with a radius R1, and each prong 26 extends from prong base 38 in a circular fashion, e.g., having a semi-curved outer surface or side 50*a* that is defined by and/or a fraction of radius R1. For example, side 50*a* has a smaller radius than prong base 38. First prong 26*a* and/or second prong 26*b* may include a taper 52, for example, at first end 46*a* and/or second end 46*b*. In some embodiments, prong base 38 has an opening or gas inlet 40 that communicates with gas outlet 30*a* of blow pin body 18.

In some embodiments, blow pin 10 has a first slot 54*a* and a second slot 54*b* that receive projections from coolant inlet 30*b* and/or outlet 30*c*. First slot 54*a* rotates coolant inlet 42*a* to communicate with coolant outlet 30*b* on blow pin body 18. Similarly, second slot 54 slideably rotates coolant outlet 42*b* to communicate with coolant inlet 30*c* on blow pin body 18. Circular or cylindrical prong base 38 extends radially outward to capture a collar ring or collar 36 (FIG. 1).

FIG. 4 is a perspective view of blow pin 10 shown in FIG. 3 with the blow pin exterior shown in ghost lines to show the internal structures of blow pin 10. Specifically, internal gas channels 20 and coolant channels 22 are located within each prong 26 of blow pin 10. Manifold 44 returns water from coolant inlet 42*a* to coolant outlet 42*b*. As illustrated in FIG. 4, manifold 44 serves to cool both prong 26 and gas channel 20 of blow pin 10 and returns or recycles the heated water supply. In this way, coolant channel 22 cycles cool water into manifold 44 and returns heated water from manifold 44 to coolant outlet 42*b*. Stated differently, manifold 44 moves and/or stores water in various locations of prong 26 to serve as a heat pump. In some embodiments, a different working fluid is used instead of water. For example, a refrigerant such as R134a (HFC R134a), Ammonia (R717), CO2, R744, hydrocarbons (HC), and/or other hydrochlorofluorocarbons (HCFC) may be used in place of water.

Figure 6:
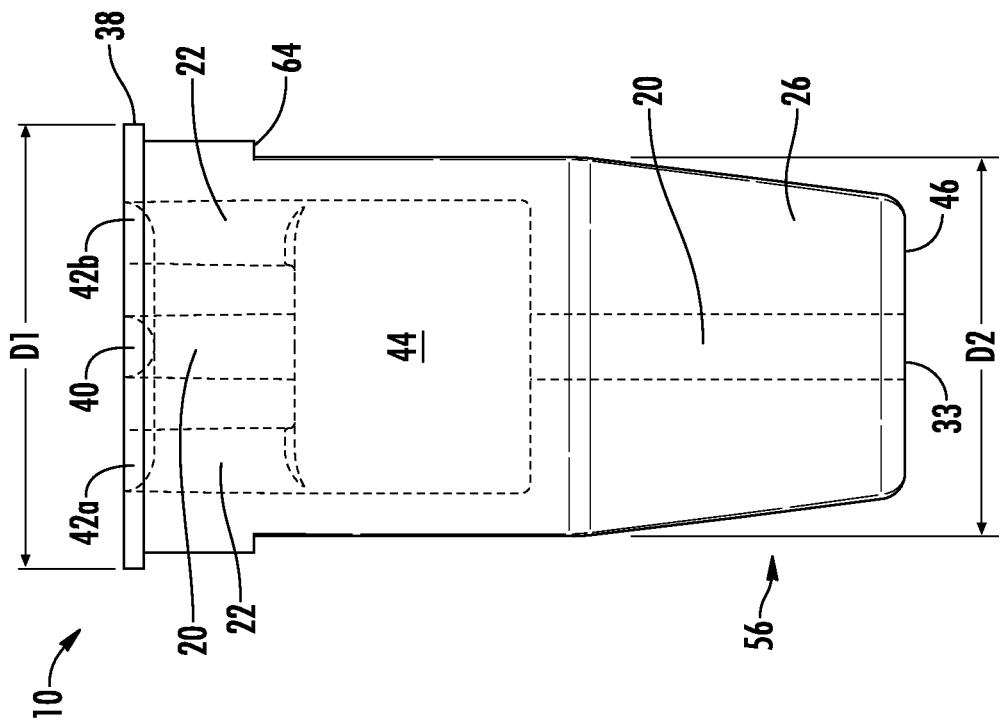
FIG. 6 is a second side taken at 90 degrees from the first side view of the blow pin illustrating the internal air and water channels in the pin.
Figure 5:
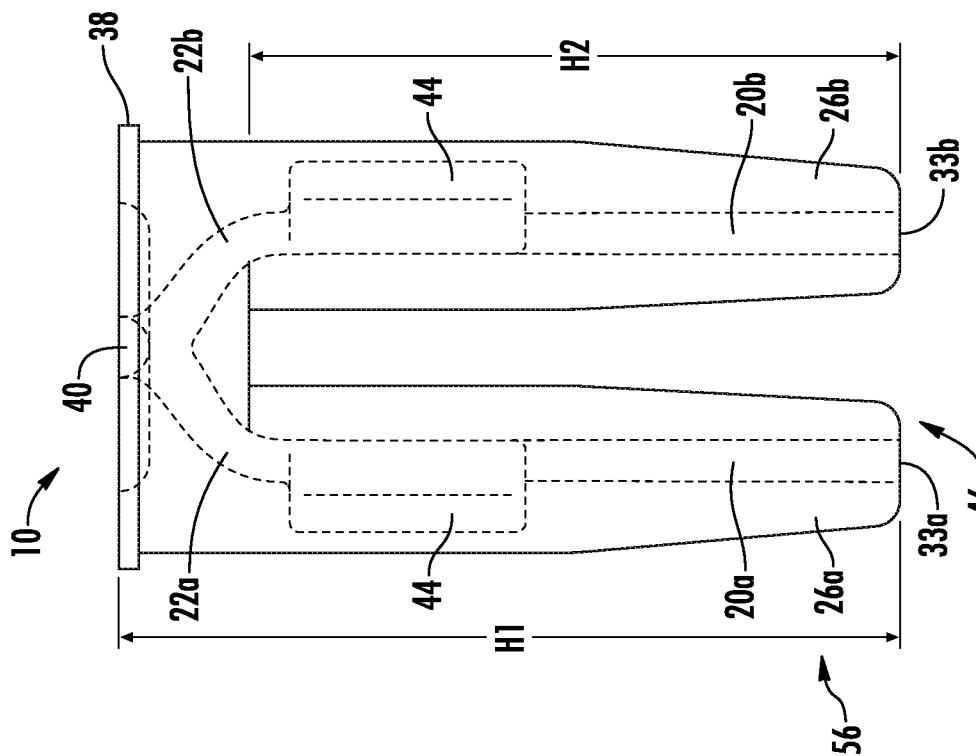
FIG. 5 is a first side view of the blow pin illustrating the internal air and water channels in the pin.

FIGS. 5 and 6 show first and second side views of blow pin 10, respectively. FIG. 5 shows internal gas channels 20 and coolant channels 22 within pin 34. FIG. 5 also shows a total height H1 of blow pin 10. In various embodiments, total height H1 is between 2 inches and 3 inches, specifically between 2.25 inches and 2.75 inches, and, more specifically, is between 2.3 inches and 2.5 inches. In this configuration, a height H2 of each branch is between 1.5 inches and 2.5 inches, specifically, between 1.75 inches and 2.25 inches, and more specifically, between 1.9 inches and 2.1 inches.

FIG. 6 is a second side taken at 90 degrees from FIG. 5 and illustrates internal gas channels 20 and coolant channels 22 within blow pin 10. FIG. 6 shows a width or diameter D1 of prong base 38 configured to couple to gas outlet 30*a* and coolant outlets 30*b* of blow pin body 18 (e.g., 2×R1=D1). In various embodiments, diameter D1 of the top plate or prong base 38 is between 1.0 inch and 1.5 inches, specifically, between 1.2 inches and 1.4 inches, and more specifically between 1.3 inches and 1.4 inches.

Figure 7:
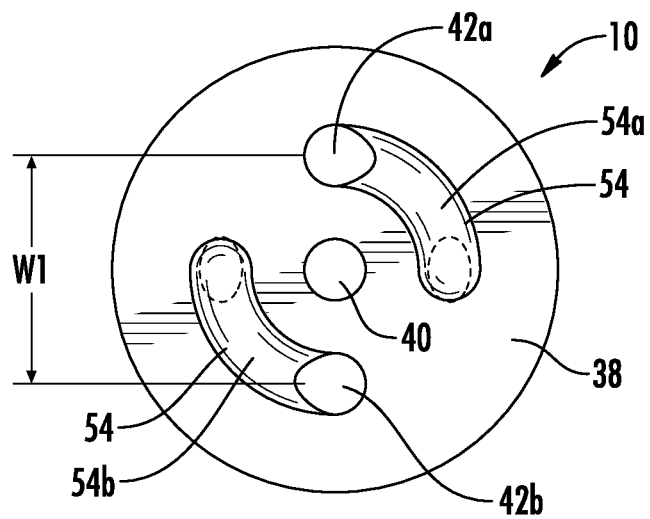
FIG. 7 is a top view of the blow pin illustrating the internal air and water channels in the pin.
Figure 8:
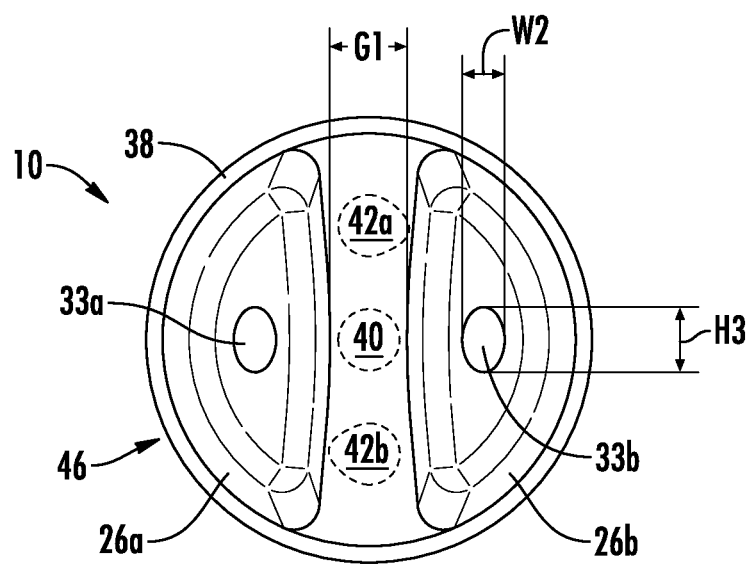
FIG. 8 is a bottom view of the blow pin illustrating the internal air and water channels in the pin.

FIGS. 7 and 8 show top and bottom views of blow pin 10, respectively, including internal gas channels 20 and coolant channels 22. As shown in FIG. 7, a width W1 between center points of a first coolant channel 22 to a second coolant channel 22 (e.g., coupled to coolant outlet 42*b* and/or coolant inlet 42*a* on blow pin body 18) on prong base 38 is between 0.5 inches and 1.5 inches, specifically between 0.6 and 1 inch, and more specifically between 0.65 inches and 0.75 inches. Gas inlet 40 is located at a central point on prong base 38. FIG. 7 also shows slots 54 that rotate prong base 38 into a locked position with blow pin body 18, e.g., when gas outlet 30*a* of blow pin body 18 aligns with gas inlet 40 of blow pin 10. In various embodiments, a gap G1 between prongs 26*a* and 26*b* is between 0.05 inches and 0.2 inches, specifically between 0.075 inches and 0.15 inches, and more specifically, between 0.1 inches and 0.125 inches. In some embodiments, gap G1 defines a thickness of a separation wall 56 between first and second chambers 16 and/or openings 14 (FIG. 1).

In various embodiments, an opening or gas outlet 33 is located on a bottom of blow pin 10 (e.g., the portion of blow pin 10 inserted into a mold) and has a width W2 of between 0.1 inches and 0.2 inches, specifically, between 0.11 inches and 0.15 inches, and more specifically, between 0.12 inches and 0.14 inches. Similarly, gas outlet 33 has a height H3 in this location between 0.1 inches and 0.5 inches, specifically between 0.15 inches and 0.3 inches, and more specifically between 0.175 inches and 0.25 inches.

Figure 9:
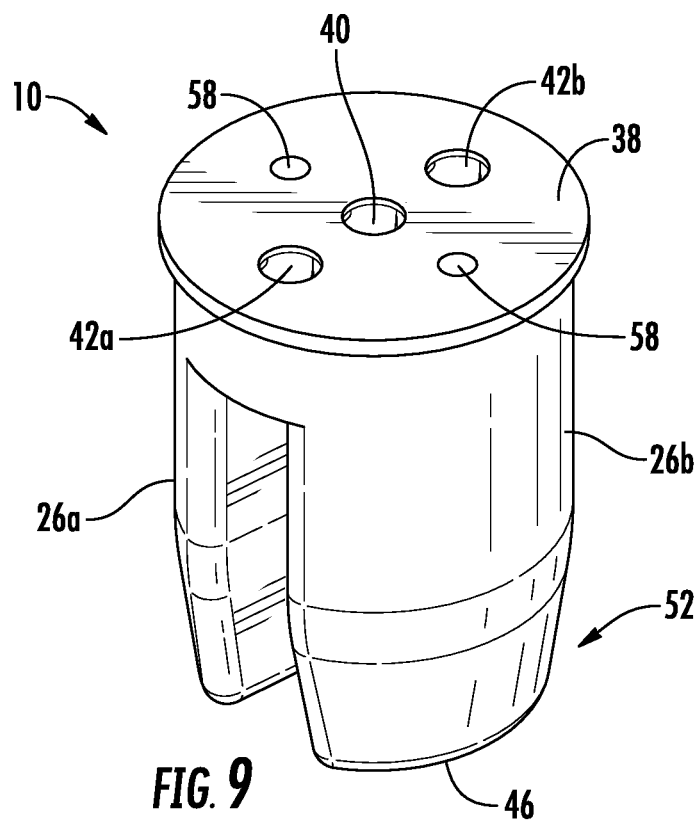
FIG. 9 is a perspective view of another embodiment of a blow pin illustrating the internal air and water channels of the pin, according to an exemplary embodiment.

FIG. 9 is a perspective view of another embodiment of a blow pin 10. Blow pin 10 shown in FIG. 9 is the same as or similar to blow pin 10 shown in FIGS. 3-8, except for the differences described. In contrast to the blow pin 10 of FIGS. 3-8, FIGS. 9-17 show an undulating coolant channel 22 that includes switchbacks 60 to enhance thermal transfer between blow pin 10 and coolant. As shown in FIG. 9, prong base 38 includes gas inlet 40, coolant inlet 42*a*, and coolant outlet 42*b*, the same as or similar to blow pin 10 shown in FIGS. 3-8. However, slots 54 are replaced with pinholes 58 for receiving pins 34 to couple blow pin 10 to blow pin body 18.

Figure 10:
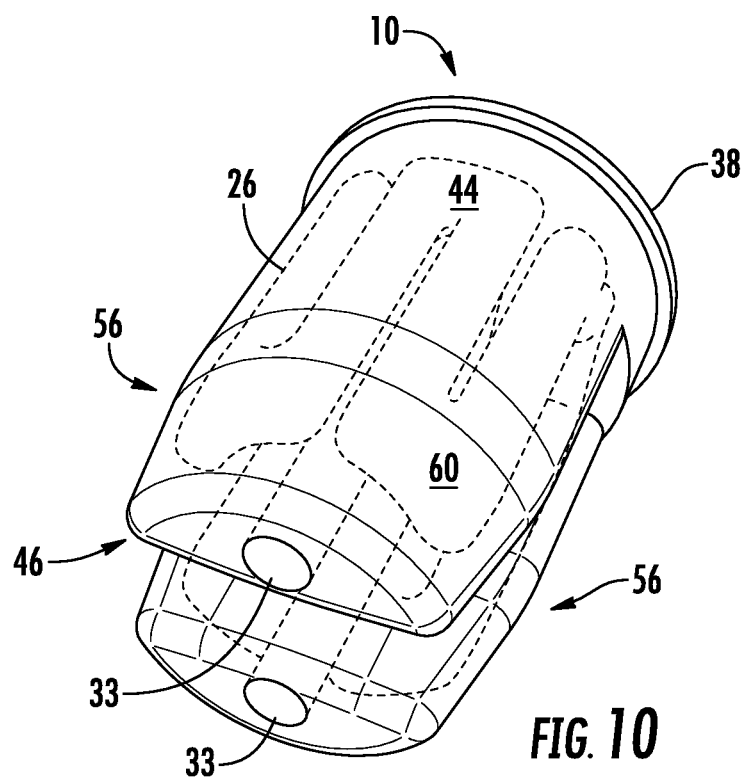
FIG. 10 is a perspective view of the blow pin illustrating an alternative configuration of the air and water channels within the blow pin, according to an exemplary embodiment.

FIG. 10 shows a different manifold 44 inside blow pin 10 that has an alternative configuration for coolant channels 22 within blow pin 10. In this configuration, manifold 44 takes a circuitous route with multiple switchbacks 60 to generate increased thermal transfer between blow pin 10 and coolant in coolant channels 22. Also, FIG. 10 shows gas outlets 33 on a bottom of blow pin 10 that circular (e.g., not oblong ellipsis) such that width W2 and height H3 (FIG. 8) are substantially equal, (e.g., gas outlet 30*a* forms a circle).

Figure 11:
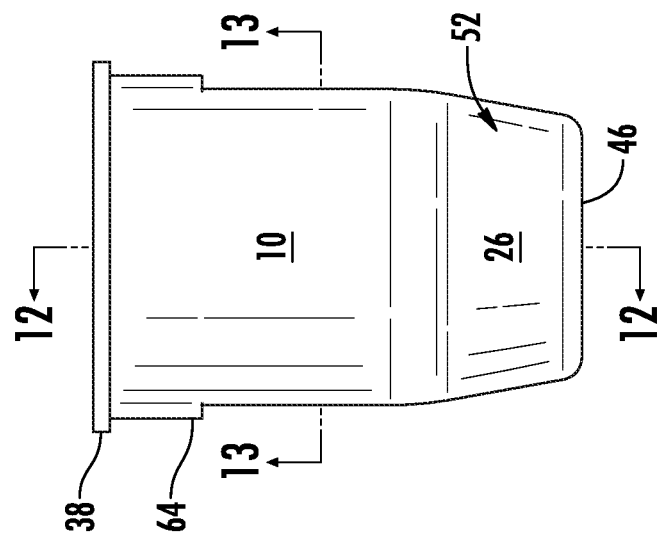
FIG. 11 is a first side view of the blow pin showing locations of cross-sectional cuts along line 12-12 and line 13-13.

FIG. 11 is a first side view of the blow pin showing similar geometry of blow pin 10 shown in FIGS. 3-8. FIG. 11 also includes lines 12-12 and 13-13 showing locations of the cuts for FIGS. 12 and 13.

Figure 12:
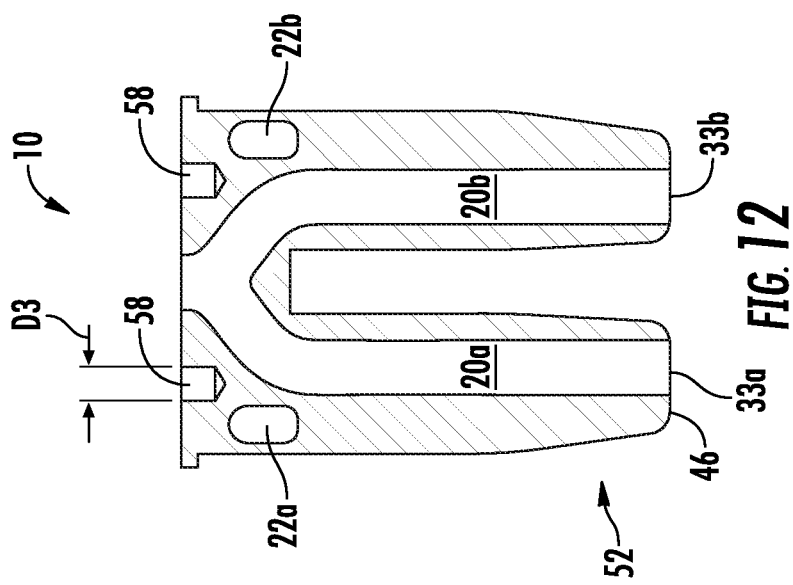
FIG. 12 is a cross-sectional view of the blow pin of FIG. 11 taken along line 12-12 show various relationships of the air and water channels within the blow pin, according to an exemplary embodiment.

FIG. 12 is a cross-sectional view of the blow pin of FIG. 11 taken along line 12-12. FIG. 12 shows a bifurcating gas channel 20 through blow pin 10 to deliver pressurized gas (e.g., air) inside a blow mold located on the bottom of blow pin 10. Manifold 44 follows an undulating pattern and is shown as a single channel manifold 44 in FIG. 12 (e.g., at the top of a switchback 60). Pinholes 58 are also shown with a diameter between 0.1 and 0.25 inches, for example, in some embodiments, pinholes 58 are 0.125+/−0.005 inches to fit ⅛" pins inside pin holes 58.

Figure 13:
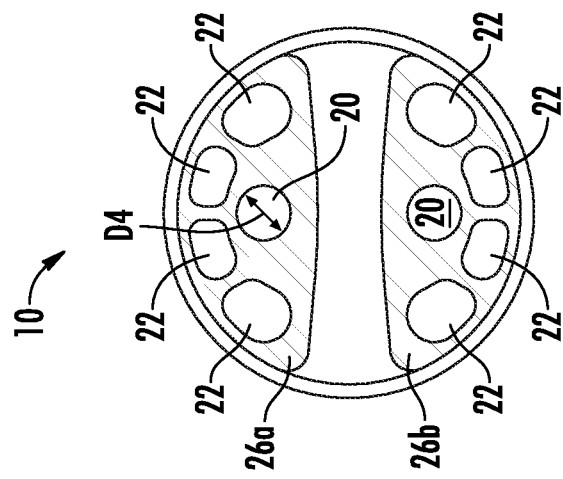
FIG. 13 is a cross-sectional view of the blow pin of FIG. 11 taken along line 13-13 to show various relationships of the air and water channels within the blow pin, according to an exemplary embodiment.

FIG. 13 is a cross-sectional view of blow pin 10 with an undulating manifold 44 taken along line 13-13 of FIG. 11 to show gas channel 20 and undulating manifold 44 forming various coolant channels 22 within blow pin 10. Gas outlet 30a and/or gas channel 20 is shown with a diameter D4 of between 0.1 inches and 0.5 inches, specifically between 0.15 inches and 0.25 inches, and more specifically, between 0.175 inches and 0.225 inches. Manifold 44 is shown with four coolant channels 22, creating two switchbacks 60 in each branch or prong 26 to cool both prongs 26 in blow pin 10.

Figure 14:
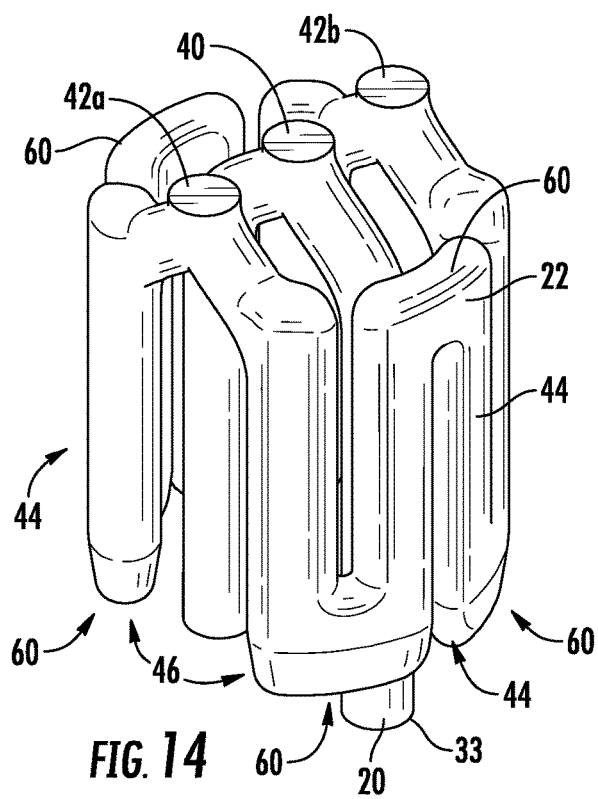
FIG. 14 shows isolated water channels and air channels located within the blow pin of FIG. 11.

FIG. 14 shows an isolated gas channel and coolant channel located within blow pin 10. In various embodiments, gas channel 20 and/or coolant channels 22 (e.g., forming manifold 44) are 3D printed within blow pin 10. For example, gas channel 20 and coolant channels 22 are sintered inside blow pin 10 with a 3D laser sintering printing process to create a metal blow pin 10 with metallic gas channels 20 and/or coolant channels 22.

Figure 15:
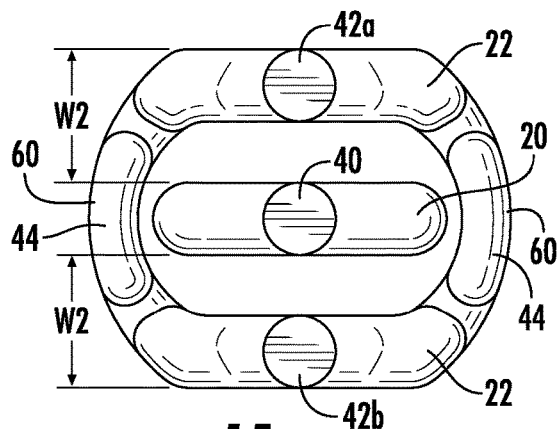
FIG. 15 is a top view of the isolated air and water channels of FIG. 14.

FIG. 15 is a top view of isolated gas channel 20 and coolant channels 22. As shown in FIG. 15 a width W3 from an exterior side of gas channel 20 to an outer or exterior side of coolant channel 22 is between 0.1 inches and 0.75 inches, specifically between 0.2 inches and 0.5 inches, and more specifically, between 0.35 inches and 0.4 inches. In some embodiments, W2 is equal on both sides of gas channel 20 to create a symmetric coolant channel 22 surrounding a bifurcated gas channel 20, as shown in FIGS. 14-17.

Figure 16:
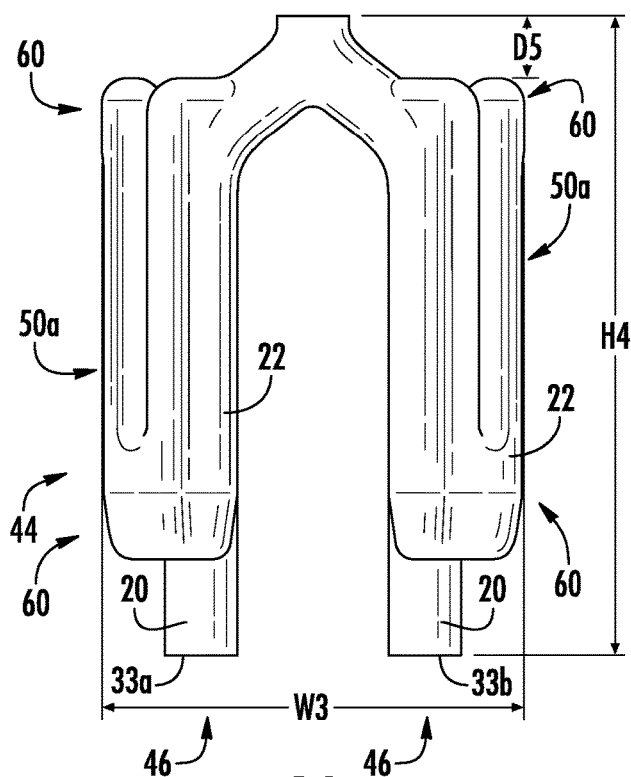
FIG. 16 is a first side view of the isolated air and water channels of FIG. 14.

FIG. 16 is a first side view of isolated gas channel 20, manifold 44, and/or coolant channels 22. Bifurcated gas channels 20 and coolant channels 22 branch or separate at a recessed depth D5 of between 0.1 inches and 0.3 inches, specifically, between 0.15 inches and 0.2 inches. A total height H4 of gas channels 20 is between 1.5 inches and 2.5 inches, specifically, between 1.75 inches and 2 inches. For example, coolant channels 22 are shorter or less than the total height H4 of gas channels 20. A total width W4 of gas channels 20 and/or coolant channels 22 is between 0.75 inches and 1.5 inches, specifically, between 1.0 inch and 1.25 inches, and more specifically between 1.1 inches and 1.2 inches.

Figure 17:
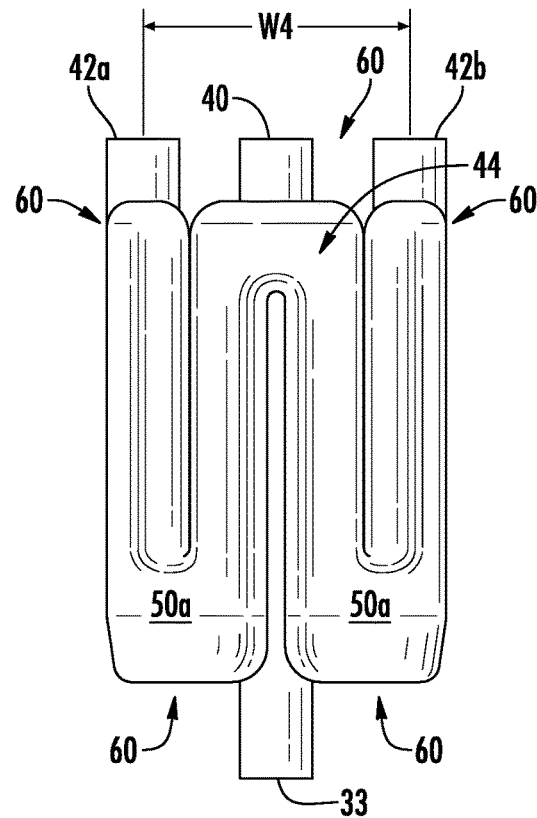
FIG. 17 is a second side view rotated at 90 degrees from FIG. 16 and showing the isolated air and water channels of FIG. 14.

FIG. 17 is a second side view of gas channels 20, manifold 44, and/or coolant channels 22. FIG. 17 is rotated 90 degrees from FIG. 16 and shows a width W4 from a center of first coolant channel 22 to a center of second coolant channel 22 that is the same or similar to width W1, shown in FIG. 7. Specifically, width W4 between center points of first coolant channel 22 to second coolant channel 22 (e.g., coupled to coolant outlet 42b and/or coolant inlet 42a on blow pin body 18) on prong base 38 is between 0.5 inches and 1.5 inches, specifically between 0.6 and 1 inch, and more specifically between 0.65 inches and 0.85 inches.

Figure 18:
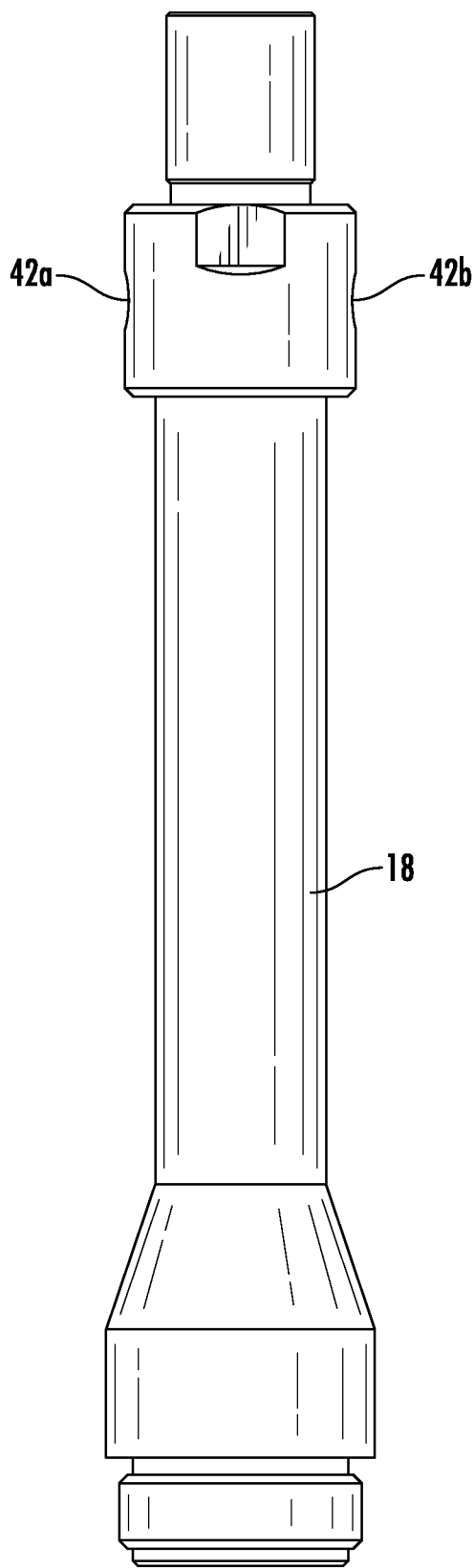
FIG. 18 is a side view of a blow pin body, according to an exemplary embodiment.
Figure 19:
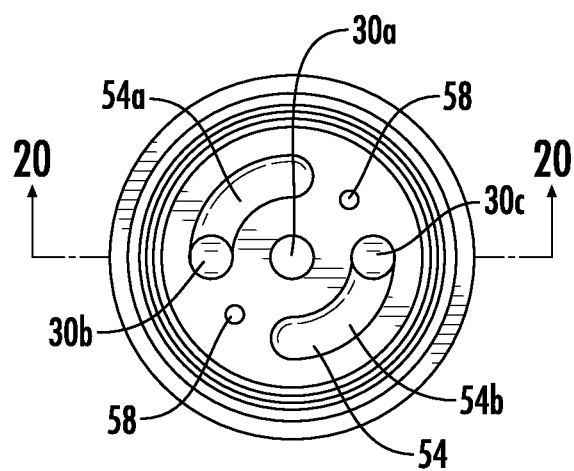
FIG. 19 is a bottom view of the blow pin body.
Figure 20:
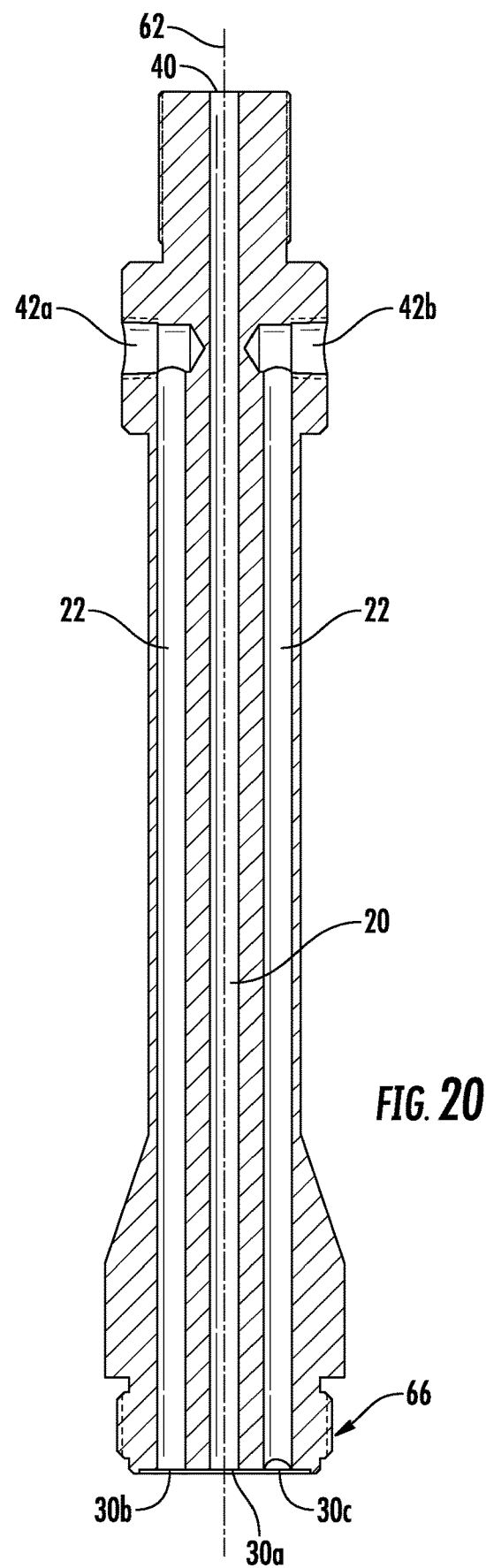
FIG. 20 is a cross-sectional view of the blow pin body taken along line 20-20 of FIG. 19.
Figure 21:
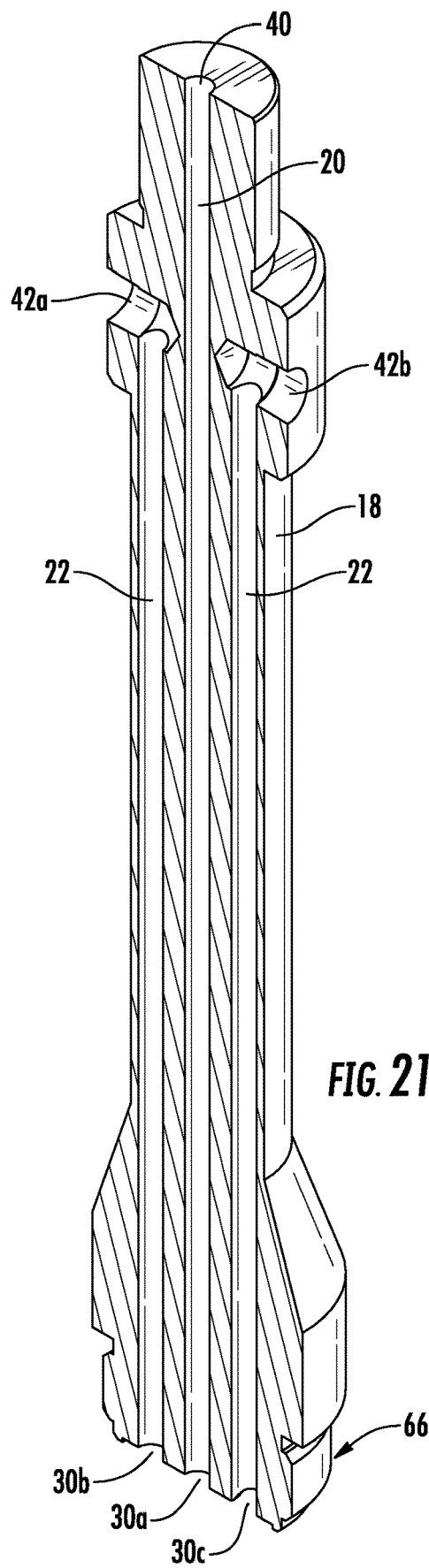
FIG. 21 is a side perspective cross-sectional view of the blow pin body taken along line 20-20 in FIG. 19.
Figure 22:
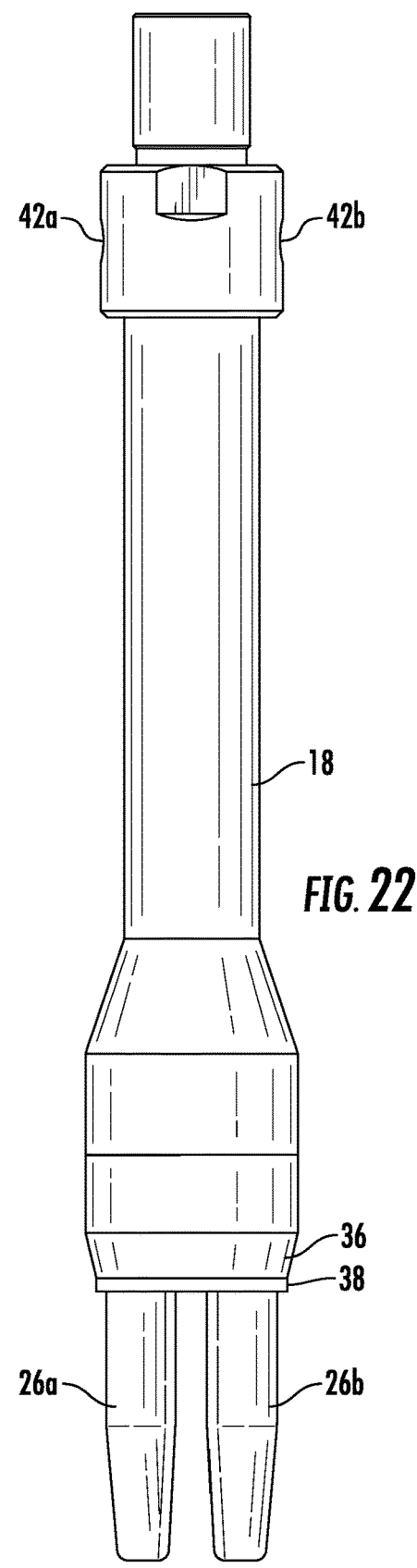
FIG. 22 is a first side view of the blow pin body coupled to the blow pin, according to an exemplary embodiment.
Figure 23:
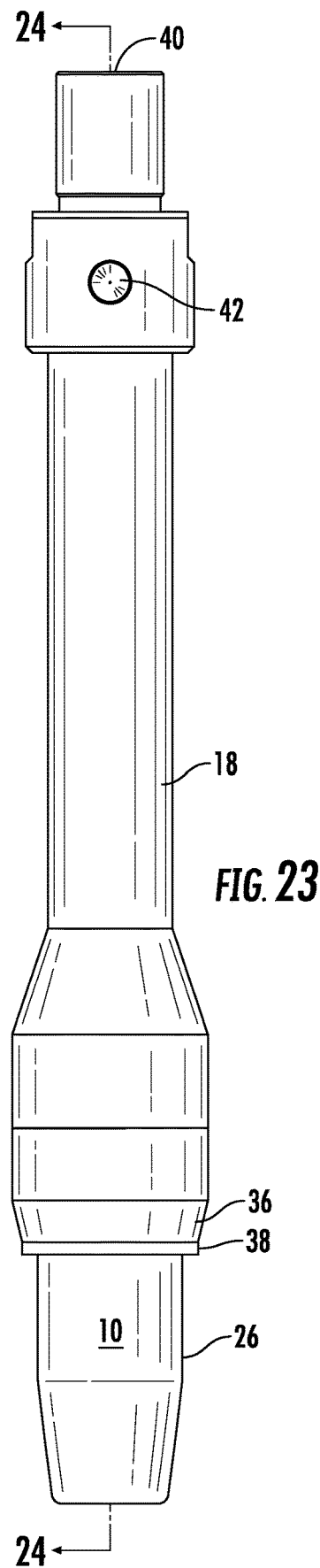
FIG. 23 is a second side view rotated 90 degrees from FIG. 23 and showing the blow pin attached to the blow pin body by a collar.

FIG. 18 is a side view of a blow pin body 18. FIG. 19 is a bottom view of blow pin body 18 and FIG. 20 is a cross-sectional view of blow pin body 18 taken along line 20-20 of FIG. 19. FIG. 19 shows slots 54 in coolant inlet 42a and coolant outlet 42b as well as gas outlet 30a and pinholes 58. This configuration couples to blow pin 10 to seal gas channels 20, manifold 44, and coolant channels 22 of blow pin 10 to blow pin body 18. FIGS. 20 and 21 are cross-sectional views of blow pin body 18 taken along line 20-20 of FIG. 19. FIG. 22 is a perspective view of blow pin body 18.

Best illustrated in FIGS. 20 and 21, blow pin body 18 includes gas channel 20 running through a central region (e.g., along axis 62) of blow pin body 18, on either side of gas channel 20 is a coolant channel 22. Coolant channel 22 has coolant inlets 30b and coolant outlets 30a that receives coolant from a source and cycle coolant through blow pin 10 before returning used coolant to the source. Locations of coolant inlets 30b and coolant outlets 30a may be reversed without changing the functionality of blow pin body 18. In this way, blow pin body 18 supplies blow pin 10 with a source of fresh/cool (e.g., unheated) coolant and receives warm (e.g., heated) coolant from blow pin 10 to maintain an operating temperature of blow pin 10 while molding. As shown in FIG. 22, blow pin body 18 couples to a bifurcated blow pin 10 that separates gas channel 20 and coolant channels 22 of blow pin body 18 inside blow pin 10.

FIGS. 23-27 show another embodiment of blow pin body 18 configured for an undulating manifold 44 and/or coolant channel 22. Various embodiments of a blow pin assembly 28 are shown for molding a multi-chamber plastic container 12 (e.g., having at least two chambers 16a and 16b). Blow molding assembly 28 includes blow pin 10, a blow pin body 18, and a collar 36. In some embodiments, chambers 16 communicate with a single opening 14 in container 12.

Blow pin 10 includes prongs 26 for each chamber, for example, first and second prongs 26a and 26b. Each prong 26 couples to prong base 38. Prong base 38 has gas inlet 40, coolant inlet 42a, and coolant outlet 42b. For example, prong base 38 is a circular disc forming gas inlet 40, coolant inlet 42a, and coolant outlet 42b.

In some embodiments, blow pin 10 has two prongs 26. First prong 26a is associated with first chamber 48a and second prong 26b is associated with second chamber 48b. First prong 26 extends from prong base 38 to a first end 46. In some embodiments, second prong 26 is parallel to first prong 26 and extends from prong base 38 to second end 46. First and second prongs 26a and 26b are integrally formed with prong base 38.

In various embodiments, each prong 26 has a circular, curved surface or side 50 defined by a radius and a height. For example, each prong 26 is tapered from prong base 38 to at the respective first and second ends 46a and 46b. Prongs 26 may be semi-cylindrical and extend from prong base 38 to a prong end 46 to form adjacent gas channels 20 into chambers 16 of container 12. Each prong defines gas channel 20 and water manifold 44. Specifically, first prong 26a defines a first gas channel 20a coupled to the gas inlet 40 to form a first gas channel 20 from gas inlet 40 to first end 46a, and second prong 26b defines a second gas channel 20b coupled to gas inlet 40 to form a second gas channel 20b from gas inlet 40 to second end 46b.

In some embodiments, each prong 26 has water manifold 44 to cool blow pin 10. First prong 26a defines first cooling water manifold 44a coupled between coolant inlet 42a and coolant outlet 42b and forming a first coolant channel 22a therebetween. Similarly, second prong 26b defines a second cooling water manifold 44b between coolant inlet 42a and coolant outlet 42b and forms a second coolant channel 22b therebetween. In some embodiments, water manifolds 44 include a semi-cylindrical chamber 48 having first and second sides 50a and 50b (FIGS. 4 and 16). A first coolant channel 22a connects outer side 50 to coolant inlet 42a and a second coolant channel 22b connects inner side 50b to a coolant inlet 42a.

Figure 24:
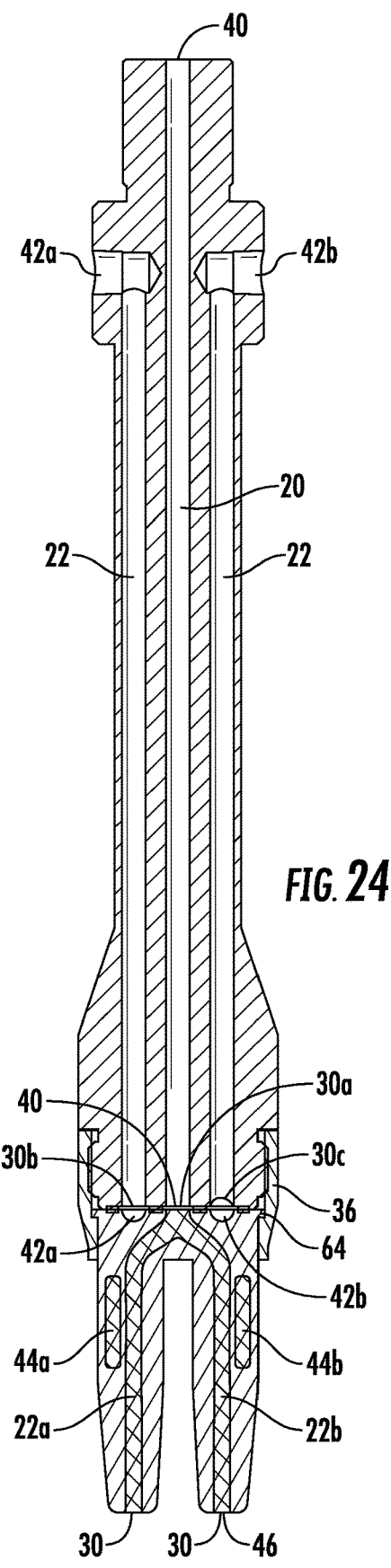
FIG. 24 is a cross-sectional view taken along line 20-20 of FIG. 19 and showing the air and water channels through the blow pin attached to the blow pin body.

In some embodiments, prong base 38 is a cylinder that is defined by diameter D1 and a height or thickness extending along axis 62. Prong base 38 is circular and includes gas inlet 40, coolant inlet 42a, and/or coolant outlet 42b. Prong base 38 extends radially to form a ridge captured by collar 36. FIG. 24 is a side view taken at 90 degrees from FIG. 22 showing blow pin 10 attached to blow pin body 18. This view shows coolant manifolds 44 on either side of blow pin 10 and a continuous gas channel 20 that passes through a center of blow pin body 18 and bifurcates to feed each prong 26 of blow pin 10. Collar 36 secures blow pin 10 against blow pin body 18.

Figure 25:
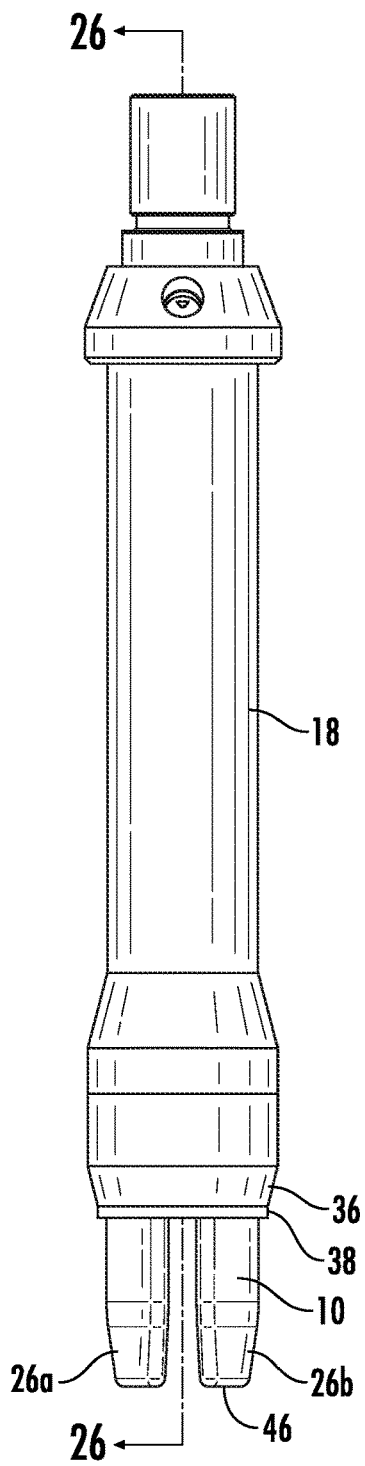
FIG. 25 is a side view of another embodiment of the blow pin attached to the blow pin body by a collar.
Figure 26:
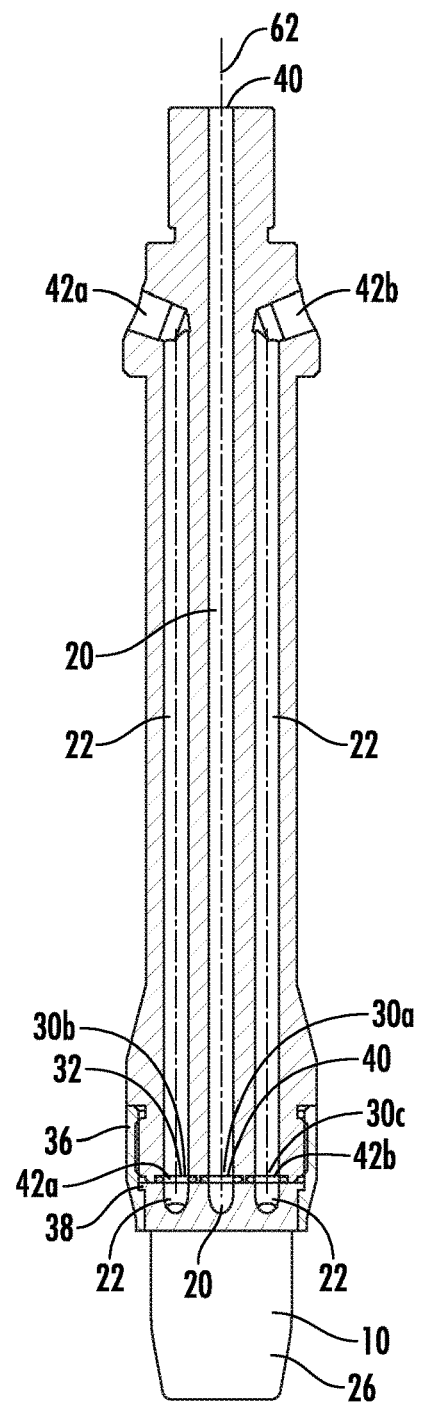
FIG. 26 is a cross-sectional view of the blow pin and blow pin body of FIG. 25 taken through a mid-plane of the blow pin assembly.
Figure 27:
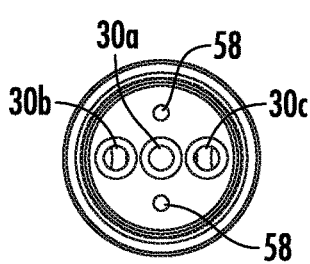
FIG. 27 is a bottom view of a blow pin body of FIGS. 25-26 with the blow pin removed.

FIG. 25 is a side sectional view of another embodiment of blow pin 10 with an undulating manifold 44 attached to blow pin body 18. FIG. 26 is a cross-sectional view of blow pin 10 with an undulating manifold 44, and blow pin body 18 of FIG. 25 taken through a mid-plane of blow pin assembly 28 illustrated in FIG. 25. Collar 36 is shown coupling blow pin 10 to blow pin body 18. FIG. 27 shows the bottom of blow pin body 18 illustrated in FIGS. 25-26 with the blow pin removed. As shown in FIG. 27, blow pin body 18 terminates with gas outlet 30a, coolant outlet 42b, and coolant inlet 42a. Pinholes 58 are located to orient blow pin 10 relative to blow pin body 18, e.g., when collar 36 secures blow pin 10 against blow pin body 18.

Figure 28:
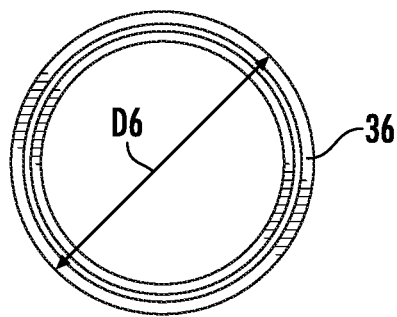
FIG. 28 is a top isometric view of a collar, according to an exemplary embodiment.
Figure 29:
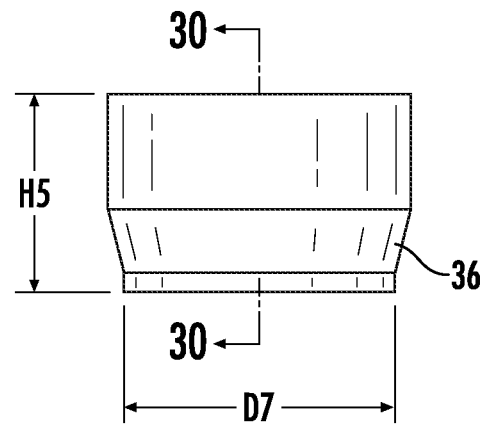
FIG. 29 is a side isometric view of the collar of FIG. 28.
Figure 30:
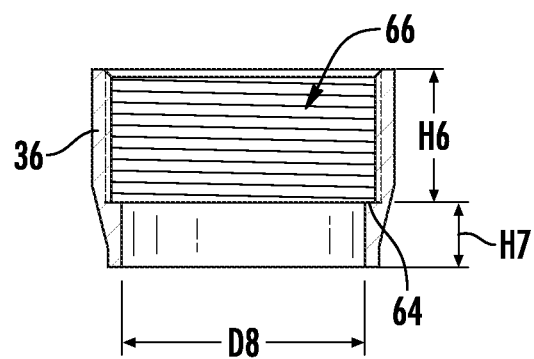
FIG. 30 is a cross-sectional view of the collar of FIG. 28 taken through a mid-plane of FIG. 29.

FIGS. 28-30 show different isometric view of collar 36. FIG. 28 is a top isometric view of collar 36. FIG. 29 is a side isometric view of collar 36, and FIG. 30 is a cross-sectional view of collar 36 taken through line 30-30 of FIG. 29. As shown, collar 36 has a mating lip, or edge 64 configured to engage blow pin 10 and retain blow pin 10 against blow pin body 18, e.g., through a threaded connection. Threads 66 on collar 36 are configured to fasten against threads on blow pin body 18 to seal and/or secure blow pin 10 relative to gas outlet 30a, and coolant inlet 42a and coolant outlet 42b on a bottom of blow pin body 18.

In various embodiments, collar 36 has an outer diameter D6 of between 1.25 inches and 2 inches, specifically, between 1.5 inches and 1.75 inches. Collar 36 has a height H5 between 0.5 inches and 1.5 inches, specifically, between 0.75 inches and 1.25 inches, and more specifically, between 1 inch and 1.15 inches. Collar 36 has a lower outer diameter D7 between 1.25 inches and 1.75 inches, specifically, between 1.3 inches and 1.5 inches, and more specifically, between 1.35 inches and 1.45 inches. A thread height H6 of threads 66 on collar 36 is between 0.5 inches and 1 inch, specifically, between 0.65 inches and 0.75 inches. Edge 64 height is between 0.25 inches and 0.5 inches, specifically, between 0.3 inches and 0.4 inches. An inner diameter D8 of collar 36 partially surrounds prongs 26 and is between 1 inch and 1.5 inches, specifically, between 1.1 inches and 1.4 inches, and more specifically, between 0.2 inches and 1.3 inches.

Figure 31A:
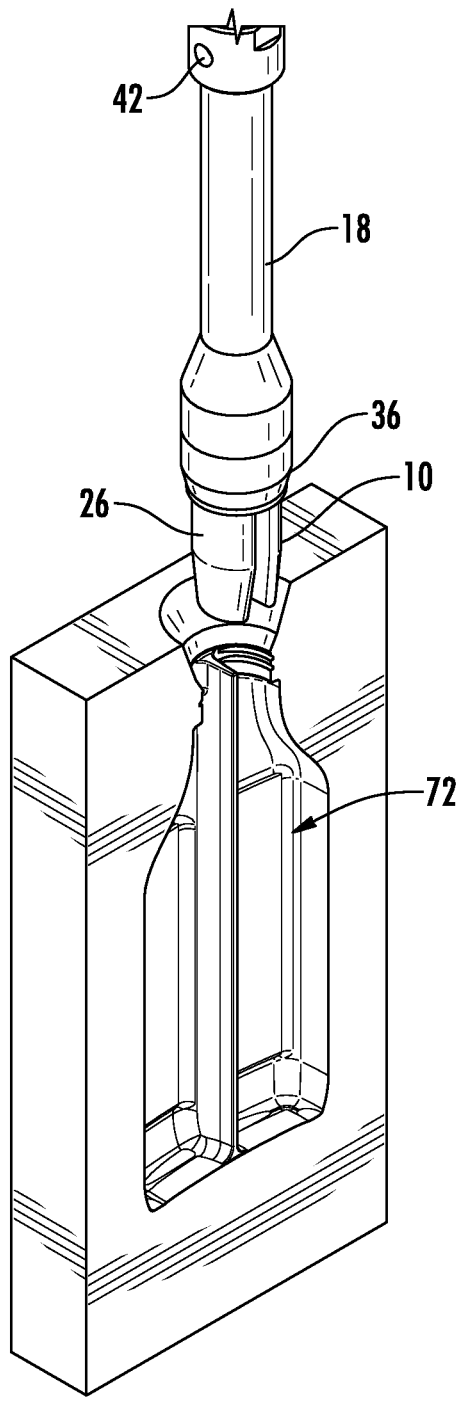
FIG. 31A is a side view of a blow pin attached to a blow pin body located above a closed mold cavity.
Figure 31B:
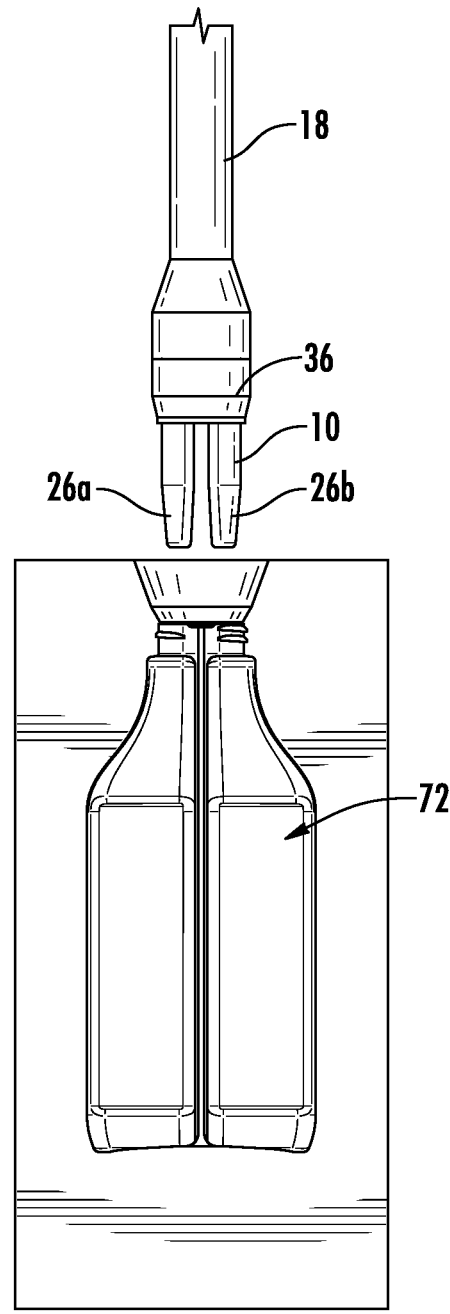
FIG. 31B is a side sectional view a blow pin attached to a blow pin body located above the closed mold cavity.

FIG. 31A is a side view of blow pin 10 attached to blow pin body 18 above a closed mold 72 cavity and FIG. 31B is a side sectional view of blow pin 10 attached to blow pin body 18 located above the closed mold 72 cavity. FIG. 32 is a side view of blow pin 10 attached to blow pin body 18 with blow pin 10 positioned within closed mold 72 cavity and FIG. 32A is a side sectional view of blow pin 10 attached to blow pin body 18 with blow pin 10 positioned within the closed mold 72 cavity. With reference to FIGS. 31 and 32, the process of blow molding container 12 is shown. First blow pin 10 is coupled to blow pin body 18 and inserted into a closed mold 72. Gas, such as air, is distributed from a source through gas channel 20 and exits from gas outlets 33 of blow pin 10. The pressurized gas forms the mold 72 for double chamber container 12.

Figure 33:
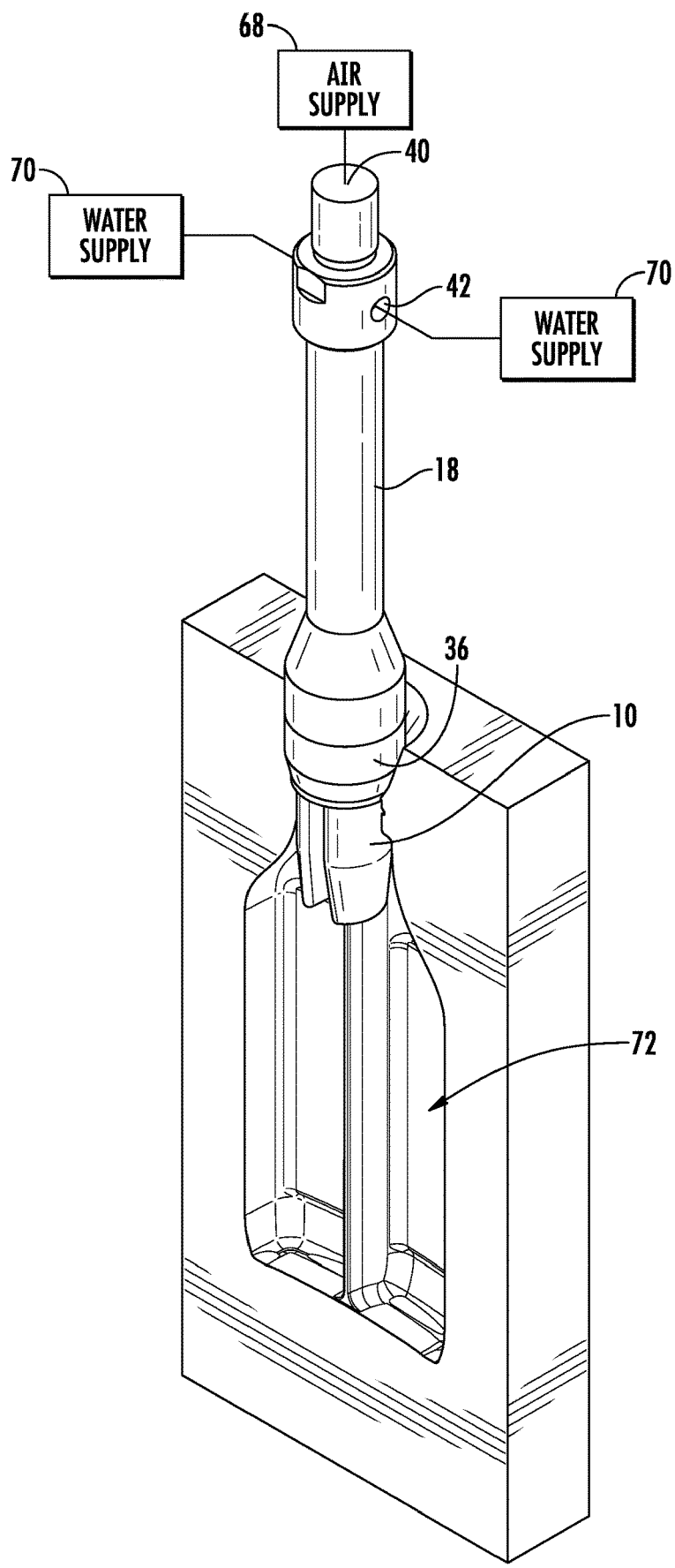
FIG. 33 is a schematic illustration of the relationship of a blow pin, blow pin body, air supply, water supply, blow pin body extender, and mold as used in a molding system to blow-mold a multi-chamber plastic container.

FIG. 33 is a schematic illustration of the relationship of blow pin 10, blow pin body 18, an air supply 68, a water supply 70, an extender such as a blow pin body 18 and mold defining a mold cavity 72 as used in a molding system to blow mold a multi-chamber plastic container 12. In various embodiments, blow molding assembly 28 includes a mold 72, an air supply 68, a water supply 70, and/or a blow pin body 18. Mold 72 defines at least two chambers 16a and 16b for a multi-chamber plastic container 12. In some embodiments, chambers 16a and 16b are in communication with a single-threaded circular opening 14. The air supply 68 is coupled to the body gas inlet 40, and the water supply 70 is coupled to the body water inlets 42a and/or outlets 30 and/or 42b. Blow pin body 18 moves blow pin 10 relative to mold 72 to form plastic container 12.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A blow mold pin for use in forming a blow-molded container including at least first and second chambers, the pin comprising:
a prong base including an air inlet, a water inlet, and a water outlet, wherein the prong base is a cylinder having a radius;
a first prong associated with the first chamber, the first prong extending from the base to a first end, the prong being integrally formed with the base, defining a first air duct coupled to the air inlet to form a first air passage from the air inlet to the first end, and defining a first cooling water manifold coupled between the water inlets and outlets to form a water channel therebetween; and
a second prong associated with the second chamber, the second prong being parallel to the first prong, extending from the base to a second end, being integrally formed with the base, defining a second air duct coupled to the air inlet to form a second air passage from the air inlet to the second end, and defining a second cooling water manifold coupled between the water inlets and outlets to form a water channel therebetween.

2. The pin of claim 1, wherein each of the prongs have a circular, curved surface having the radius.

3. The pin of claim 2, wherein each of the prongs is tapered at the respective first and second ends.

4. The pin of claim 3, wherein the manifolds each include a semi-cylindrical chamber having first and second sides, a first tube connecting the first side to the water inlet, and a second tube connecting the second side to a water inlet.

5. The pin of claim 4, shaped to form a dual-chamber plastic container having a single opening that merges two or more respective openings for each of the chambers.

6. The pin of claim 5, formed from layers of metal powder, laser sintered together to form an integral one-piece blow mold pin.

7. The pin of claim 5, wherein the prong base includes a circular top plate including an opening which communicates with the air inlet, a first slot which communicates with the water inlet and a second slot which communicates with the water outlet, the circular top plate extending from the prong base to form a collar ring.

8. A blow molding assembly comprising:
a blow pin including;
a prong base including an air inlet, a water inlet, and a water outlet,
a first prong associated with a first chamber, the first prong extending from the base to a first end, the prong being integrally formed with the base, defining a first air duct coupled to the air inlet to form a first air passage from the air inlet to the first end, and defining a first cooling water manifold coupled between the water inlets and outlets for form a water channel therebetween, and
a second prong associated with a second chamber, the second prong being parallel to the first prong, extending from the base to a second end, being integrally formed with the base, defining a second air duct coupled to the air inlet to form a second air passage from the air inlet to the second end, and defining a second cooling water manifold coupled between the water inlets and outlets to form a water channel therebetween,
wherein the prong base includes a circular top plate through which the air inlet, water inlet, and water outlets extend, the circular top plate extending from the prong base to form a collar ring;
a cylindrical blow pin body extending from a first body end to an circular interface surface, the body including an body air inlet at the first end, a body outlet in the interface surface and an air channel defining an air passage from the body air inlets and outlets, the body further including a body water inlet, a body water outlet, an interface surface water outlet, and interface surface water inlet, a first water channel defining a water passage from the body water inlet to the interface surface water outlet and a second water channel defining a water passage from the interface surface water inlet to the body water outlet; and
a collar which engages the collar ring and the blow pin body proximate to the interface surface to fasten the blow pin to the blow pin body such that the circular top plate rest against the interface surface such that air inlet communicates with the body air outlet, the interface water outlet communicates the water inlet and the interface water inlet communicates with the water outlet.

9. The pin of claim 8, wherein the prong base is a cylinder having a radius.

10. The pin of claim 9, wherein each of the prongs have a circular, curved surface having the radius.

11. The pin of claim 10, wherein each of the prongs is tapered at the respective first and second ends.

12. The pin of claim 11, wherein the manifolds each include a semi-cylindrical chamber having first and second sides, a first tube connecting the first side to the water inlet, and a second tube connecting the second side to a water inlet.

13. The pin of claim 12, shaped to form a dual-chamber plastic container having a single opening that merges its respective openings for each of the chambers.

14. The pin of claim 13, formed from layers of stainless steel metal powder, laser sintered together to form an integral one-piece blow mold pin.

15. A blow molding assembly for molding a multi-chamber plastic container having at least two chambers which communicate with a single opening in the container, the assembly comprising:
a blow pin including;
a prong base including a circular top plate, an air inlet, a water inlet, and a water outlet,
a first prong associated with the first chamber, the first prong extending from the base to a first end, the prong being integrally formed with the base, defining a first air duct coupled to the air inlet to form a first air passage from the air inlet to the first end, and defining a first cooling water manifold coupled between the water inlets and outlets for form a water channel therebetween, and
a second prong associated with the second chamber, the second prong being parallel to the first prong, extending from the base to a second end, being integrally formed with the base, defining a second air duct coupled to the air inlet to form a second air passage from the air inlet to the second end, and defining a second cooling water manifold coupled between the water inlets and outlets for form a water channel therebetween;
a cylindrical blow pin body extending from a first body end to an circular interface surface, the body including an body air inlet at the first end, a body outlet in the interface surface and an air channel defining an air passage from the body air inlets and outlets, the body further including a body water inlet, a body water outlet, an interface surface water outlet, and interface surface water inlet, a first water channel defining a water passage from the body water inlet to the interface surface water outlet and a second water channel defining a water passage from the interface surface water inlet to the body water outlet;

a collar which engages the collar ring and the blow pin body proximate to fasten the blow pin to the blow pin body such that the circular top plate rests against the interface surface such that air inlet communicates with the body air outlet, the interface water outlet communicates the water inlet, and the interface water inlet communicates with the water outlet;

a mold cavity defining at least two chambers for a multi-chamber plastic container wherein the chambers are in communication with a single-threaded circular opening;

an air supply coupled to the body air inlet;

a water supply coupled to the body water inlets and outlets;

a blow pin body extender for moving the blow pin relative to the mold cavity to form the plastic container.

16. The pin of claim 15, wherein the prong base is cylindrical having a radius.

17. The pin of claim 16, wherein each of the prongs have a circular, curved surface having the radius.

18. The pin of claim 17, wherein each of the prongs is tapered at the respective first and second ends.

19. The pin of claim 18, wherein the manifolds each include a semi-cylindrical chamber having first and second sides, a first tube connecting the first side to the water inlet, and a second tube connecting the second side to a water inlet.

* * * * *